Feb. 3, 1970  E. G. TIEGEL ET AL  3,493,035
APPARATUS FOR JOINING BATTERY POSTS
Filed Oct. 22, 1965  4 Sheets-Sheet 2
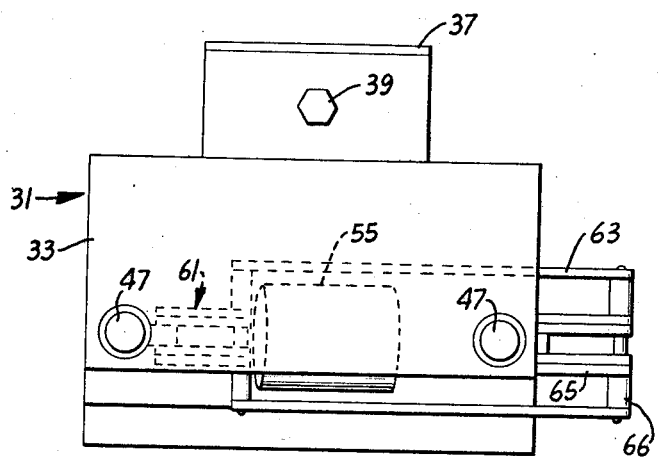
FIG. 2.
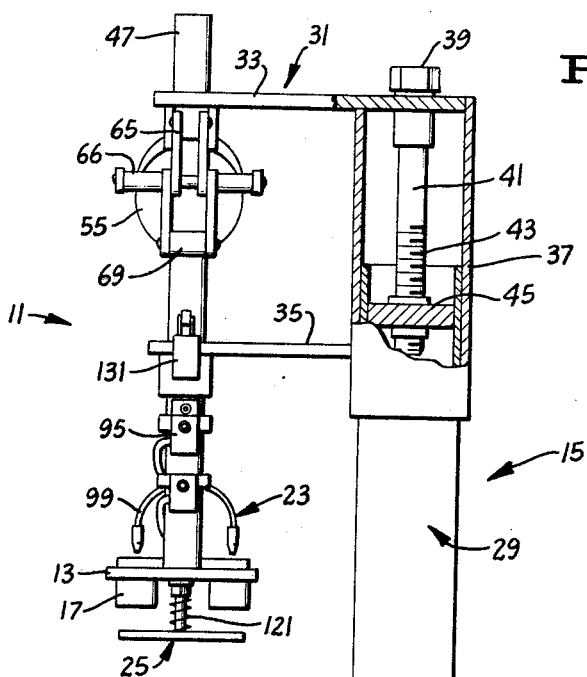
FIG. 3.
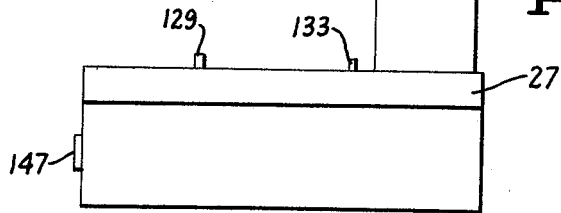
INVENTORS
ERNEST G. TIEGEL
BY RALPH G. TIEGEL
*Schapp & Hatch*
ATTORNEYS

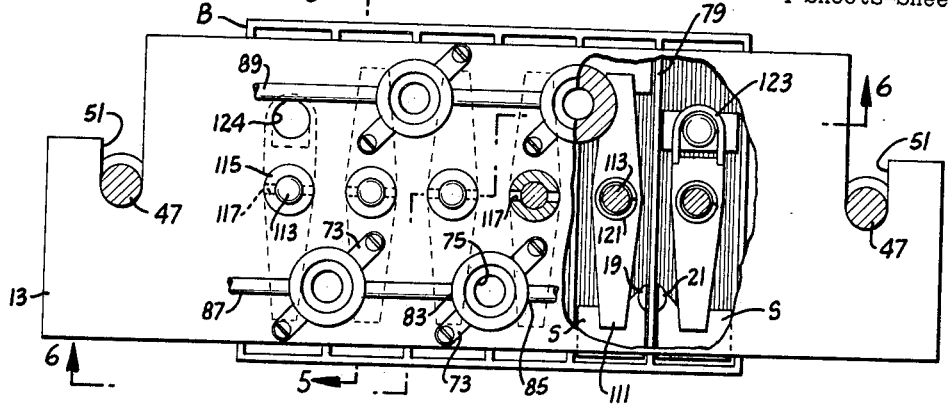
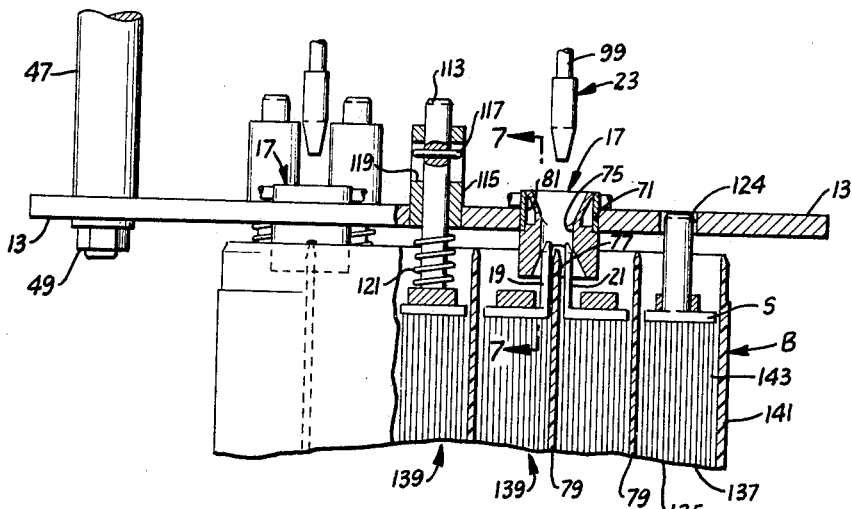
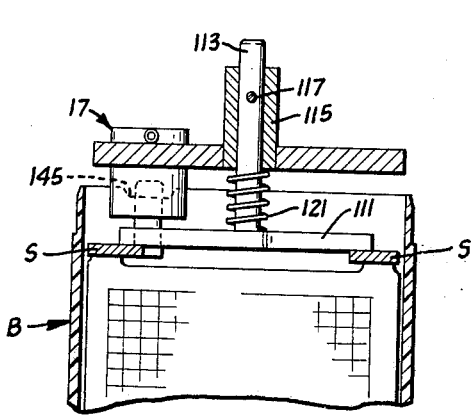
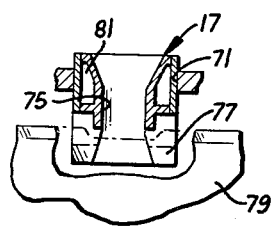

Feb. 3, 1970  E. G. TIEGEL ET AL  3,493,035
APPARATUS FOR JOINING BATTERY POSTS
Filed Oct. 22, 1965  4 Sheets-Sheet 4

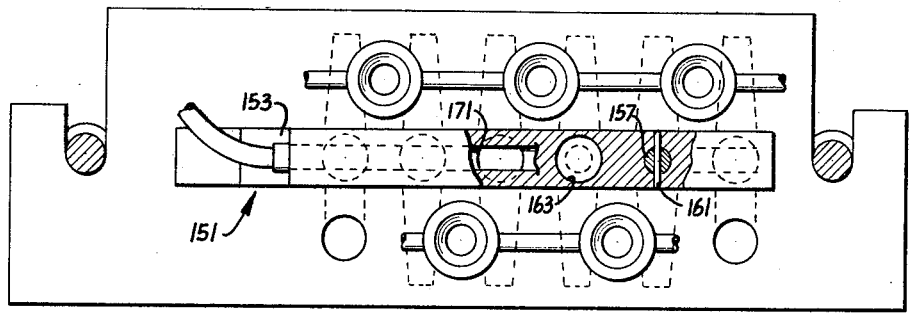

FIG. 8.

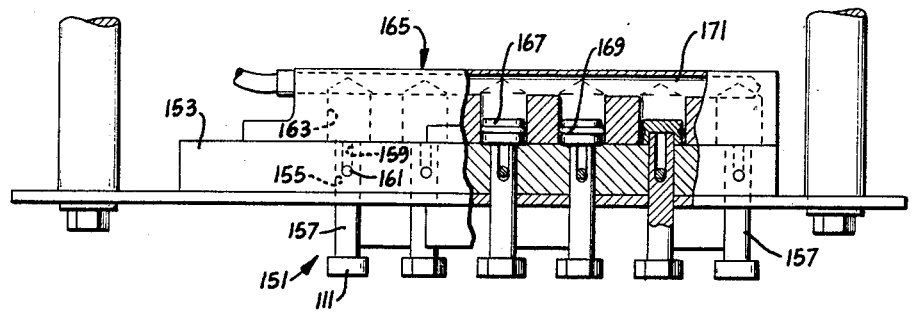

FIG. 9.

| | AVERAGE TIME 12 SECONDS | | AVERAGE TIME 12 SECONDS | |
|---|---|---|---|---|
| WATER COOLING | ON | | OFF | |
| BURNING FLAME | | INCREASE | DECREASE | |
| BURNING HEAD 35 | DOWN | | UP | |
| LINE UP STOP 129 | ACTIVATED | | RELEASED | |
| HOLD DOWN MEANS | DEENERGIZED | ENERGIZED | | |

BATTERY MOVES OVER INITIATING SWITCH 125 | OPERATOR INITIATES START BUTTON 147 BURNING HEAD 35 MOVES DOWN | BURNING HEAD IS DOWN BURNING FLAME INCREASES | BURNING FLAME DECREASES | COOLING TIME IS FINISHED BURNING HEAD 35 MOVES UP | RECYCLE

FIG. 10.

INVENTORS
ERNEST G. TIEGEL
RALPH G. TIEGEL
BY Schapp & Hatch
ATTORNEYS

United States Patent Office 3,493,035
Patented Feb. 3, 1970

3,493,035
APPARATUS FOR JOINING BATTERY POSTS
Ernest G. Tiegel, Redwood City, and Ralph G. Tiegel, San Carlos, Calif., assignors to Tiegel Manufacturing Co., Belmont, Calif., a corporation of California
Filed Oct. 22, 1965, Ser. No. 501,036
Int. Cl. B22d 19/00
U.S. Cl. 164—334                                 19 Claims

ABSTRACT OF THE DISCLOSURE

Apparatus for forming battery cell plate assembly connector posts by burning or fusing half posts together in a cooled mold which retains the molten metal in the desired post shape. A plurality of ring shaped molds are carried on a plate for movement between an operative position with the molds encircling the connector posts and a retracted position. The posts are separated from the molds by hold-down fingers.

---

This invention relates to a method and apparatus for joining battery posts, and more particularly to a method and apparatus for joining battery cell post members of cell plate structures together across cell dividers.

Briefly, the invention contemplates a platen movable between a retracted position and an operative position, a plurality of molds connected to the platen for encircling pairs of post members when the platen is in its operative position, heat producing means adapted to produce heat adjacent the pairs of the post members encircled by the molds for melting the post members to allow the members of each pair to fuse together, and hold down means operatively connected to the platen for holding the cell plate structures against movement while the molds are moved from their post encircling positions.

In the manufacture of electrical storage batteries such as the lead-acid batteries commonly used in the automotive field, groups or stacks of battery plates and separators are contained in separate cells in the battery case. Electrical connections between all of the positive plates of a cell and between all of the negative plates of a cell are normally accomplished by means of lead connector straps which join lugs projecting upwardly from the battery plates. The negative plates of certain cells are connected to the positive plates of certain adjacent cells and the positive plates of other cells are connected to the negative plates of certain adjacent cells, usually by interconnected post members which extend upwardly from the connector straps of two adjacent cells. The post members, which are generally formed of lead, are normally located adjacent a common cell divider and are connected by "burning," that is, by melting the upper ends of the members to permit them to fuse together over the upper edge of the cell divider. This process of connecting the post members is often referred to as a "burning" process.

Molds are placed around the upper ends of the adjacent post members to hold the molten lead so that when the upper ends of the latter are melted, they will fuse together, rather than run down the post members like wax of a burning candle. After the molten lead has solidified, thus joining the post members together, the molds are lifted off the post members. However, the molds often tend to adhere to the post members and thereby lift the post members and their associated connector straps and plates out of the battery case. In doing this, the post members might break off from their connector straps or the straps might be pulled loose from the plates, thereby resulting in a defective battery which would have to be rejected and withdrawn from the production line. Even if the post members did not break off or the connector straps pull loose when the post members stuck to the rising molds, the molds and post members had to be separated manually, thus causing a considerable loss of production time.

Accordingly, one of the principal objects of the present invention is the provision of a method and apparatus for joining battery post members which facilitates the separation of the molds and post members when the molds are raised, thereby preventing damage to the battery and consequent production delays.

Another object of the invention is the provision of a method and apparatus of the class described wherein the molds are continuously cooled to facilitate solidification of the fused post members.

A further object of the invention is the provision of apparatus such as described which is adapted to facilitate the placement of a battery in proper alignment with the molds.

A still further object of the invention is the provision of apparatus of the class described which can be quickly converted to accommodate different types of batteries.

Another object of the invention is the provision of apparatus such as described which is readily adjustable to accommodate batteries of different heights.

A further object of the invention is the provision of apparatus of the class described which is semi-automatic in operation, thus reducing the possibility of human error in the manufacture of batteries.

Another object of the invention is the provision of apparatus of the class described which is relatively simple in construction, yet reliable in operation.

Still another object of the invention is the provision of a method of the class described which is relatively easy to perform.

Further objects and advantages of our invention will become apparent as the specification proceeds, and the new and useful features of our method and apparatus for joining battery posts will be fully defined in the claims attached hereto.

In the accompanying drawings, in which one of various possible embodiments of the invention are illustrated, FIGURE 1 is a front view in elevation of the apparatus of this invention;

FIGURE 2 is a plan view of the apparatus shown in FIGURE 1;

FIGURE 3 is a side view of the apparatus shown in FIGURE 1;

FIGURE 4 is an enlarged plan view as seen from the line 4—4 of FIGURE 1, certain parts being broken away;

FIGURE 5 is a section taken on line 5—5 of FIGURE 4;

FIGURE 6 is a section taken on line 6—6 of FIGURE 4;

FIGURE 7 is a section taken on line 7—7 of FIGURE 6;

FIGURE 8 is a plan view of an alternate form of hold down means utilized in the present invention;

FIGURE 9 is a view in elevation of FIGURE 8, certain parts being broken away and shown in section for clarity; and FIGURE 10 is a timing cycle diagram of the apparatus using the hold down means shown in FIGURE 8.

Figure 1:
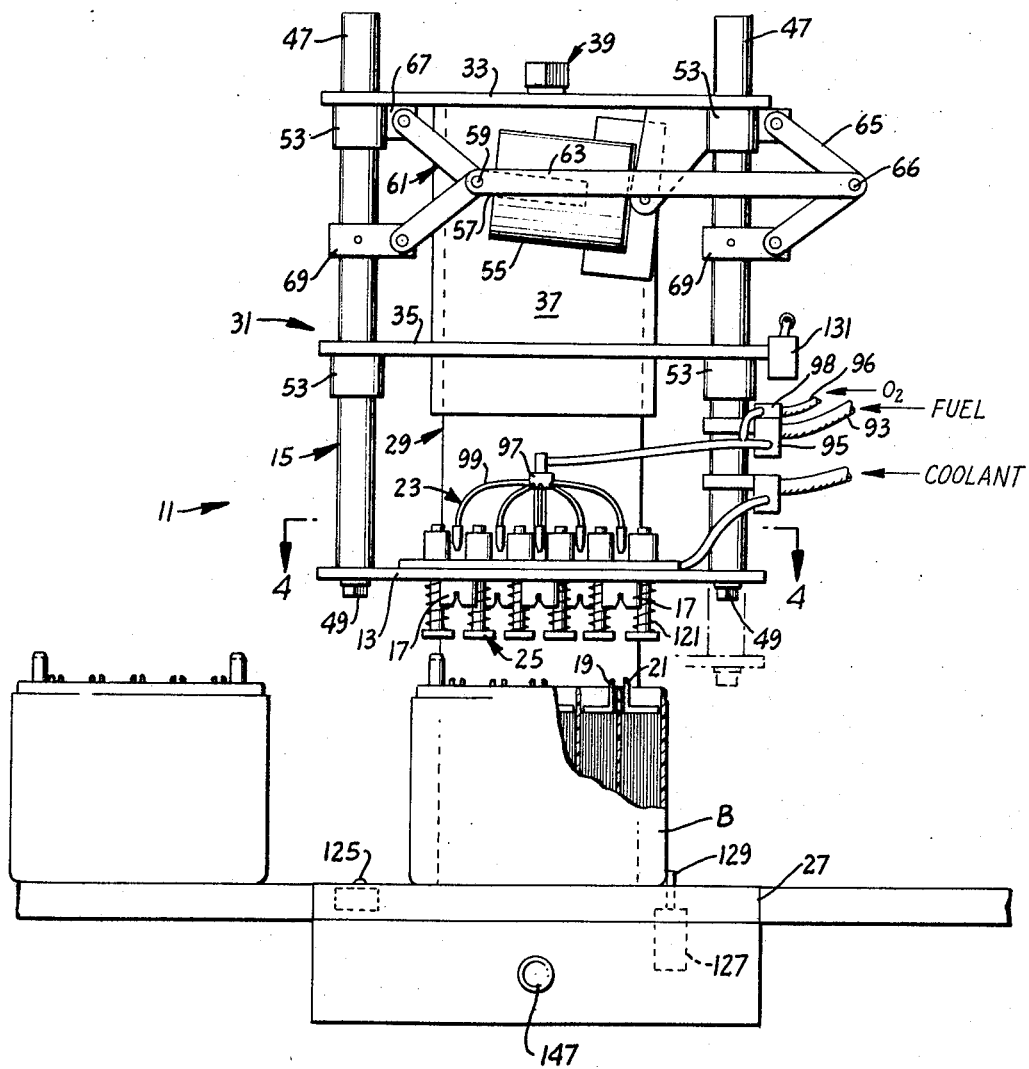

Referring now to the drawings, apparatus for joining battery cell post members of cell plate structures together across cell dividers of a battery is generally indicated at 11 in FIGURE 1 and includes a platen 13 mounted on a frame 15 for movement between a retracted position and an operative position over a battery B, a plurality of molds 17 carried by the platen for encircling pairs of adjacent post members 19 and 21 when the platen is lowered to its operative position, heat producing means 23 adapted to produced heat adjacent the pairs of post members enrcled by the molds for melting the post members to low the members of each pair to fuse together, and hold own means 25 for holding the cell plate structures against iovement while the molds are lifted from their post enrcling positions.

The frame 15 includes a base 27 for supporting a battery B and a post 29 extending upwardly from the rearard side of the base 27. A carrier 31 to which the platen 3 is connected comprises a pair of plates 33 and 35 cured to a sleeve 37 slidably mounted on the post 29. he carrier is mounted for vertical adjustment by a bolt 9, the unthreaded portion 41 of which is rotatably journaled in plate 33 at the center of the sleeve 37, and the wer threaded portion 43 of which is threaded into an sert 45 secured to the inside of post 29. It will be seen at rotation of bolt 39 causes the carrier to be moved pwardly or downwardly depending on the direction in hich the bolt 39 is rotated.

Platen 13 is connected to two rods 47 by bolts 49 which xtend through slots 51 (see FIGURE 4) in the platen. he rods 47 extend upwardly through sleeved bearings 53 the plates 33 and 35 so as to mount the platen 13 for ovement in a vertical direction. The platen and its ssociated rods 47 are adapted to be moved in a vertical irection by an air cylinder 55 connected to plate 33. The lunger 57 of cylinder 55 is conected by a pin 59 to a pair f toggle linkages 61 and also to one end of a pair of elonated links 63, the other ends of which are connected to pair of toggle linkages 65 by a pin 66. The upper links f each of the toggle linkages 61 and 65 are connected to ars 67 connected to the upper plate 33, while the lower inks of toggle linkages 61 and 65 are connected to clamps 9 secured to the rods 47.

The molds 17 extend through holes 71 in the platen 13 nd have laterally extending straps 73 which are secured o the platen by bolts. As illustrated in FIGURES 4 and , each mold 17 includes a first passage 75 which extends enerally vertically through the mold. The molds have lots 77 which are adapted to receive the upper ends of ell dividers 79 when the molds and platen are lowered nto their operative position. The central portion of the assage 75 is formed so as to receive the upper ends of he post members 19 and 21 as the latter are located on opposite sides of a divider 79.

In accordance with the present invention, another circular pasage 81 extends through each mold 17 and provides a path for a coolant, such as water, to be circulated hrough the mold for cooling the latter. Delivery and exhaust connections 83 and 85, respectively, are connected o the pasage 81 of each mold. Water is supplied to the delivery connection 83 of each mold from a suitable water source through a delivery pipe 87. Similarly, the water is carried away from the molds by a discharge pipe 89 connected to the exhaust connections 85 of the molds 17. The molds 17 are located on the platen 13 in such manner that there is one mold adapted to extend across each cell divider 79. As shown in FIGURE 4, this is accomplished by staggering the molds 17 on opposite sides of the platen and likewise locating the post members 19 and 21 in a staggered relationship on opposite sides of the battery.

The heat producing means 23 here includes a gas delivery line 93 connected to a gas valve 95 secured to one of the rods 47 and secured at its other end to a distributor 97. An oxygen line 96 passes through a cut-off valve 98 and is connected to line 93 to allow the fuel and oxygen to mix. A plurality of individual lines 99, there being one for each mold 17, are connected to the distributor 97 and extend to a position directly over the upper end of the passages 75 in the molds 17.

As may best be seen in FIGURES 4–6, one type of the hold down means 25 comprises a plurality of elongated hold down fingers 111, each of which is connected to the lower end of a rod 113 extending upwardly through a journaling sleeve 115 connected to the platen 13. A pin 117 extends through the upper end of rod 113 into vertical slots 119 located in the tubular sleeve 115 for preventing any turning motion of the rod and associated hold down finger. In this form of the invention, the hold down finger is biased away from the platen 13 by a compression spring 121 which surrounds the rod 113. The elongated hold down fingers 111 are positioned so as to engage the upper ends of the straps connecting the posts 19 and 21 to the battery plates. The hold down fingers at opposite ends of the platen are shortened and provided with U-shaped collars 123 which are vertically aligned with holes 124 in the platen and adapted to encircle the terminal ports of a battery located on the base 27 when the platen is lowered onto the battery.

The base 27 is provided with a signal button 125 which, when pressed downwardly, causes a solenoid 127 to raise a stop 129 in the path of a battery. A switch 131 connected to plate 35 is adapted to be actuated after the platen 13 is lowered to the burning position. The actuation of switch 131 causes burners 23 to start and after deactuation causes the solenoid 127 to be operated to lower the stop 129 below the surface of base 27. A back space stop 133 is connected to base 27 to limit the rearward movement of a battery placed on the base. The stop 133 may be moved forwardly and rearwardly toward and away from the post 29 so that batteries of different sizes may be accommodated by the apparatus.

A conventional lead-acid battery, such as shown at B, includes groups or stacks of battery plates 135 spaced from one another by separators 137 in separate cells 139 in a battery case 141. Lead connector straps S join the upwardly projecting lugs 143 of the battery plates and the post members 19 and 21 extend upwardly from the connector straps S. The post members 19 and 21 are located adjacent the cell divider 79 and extend upwardly beyond the upper edge of a notch 145 cut in the upper edge of the cell divider. The post members 19 and 21 may be rectangular in cross-section or semi-circular in cross-section, and for purposes of description, are herein shown as being semi-circular in cross-section. Prior to being joined, the post members 19 and 21 extend upwardly beyond the upper edge of the notch 145 in the cell divider, as shown in FIGURE 6.

Operation of the apparatus is as follows:

The carrier 31 is first adjusted to the height necessary to allow the platen 13 to be moved down into its covering relationship with respect to a battery B. This is done by rotating the bolt 39 in the proper direction in order to raise or lower the carrier 31. The valve 95 is adjusted so that a relatively small flame is maintained at the end of each of the fuel lines 99 when the platen is in a raised position, but a relatively large burning flame is created when the platen is lowered to its operative position.

A battery B is next pushed along a table or other support onto base 27 over the button 125. When button 125 is pushed downwardly, it actuates the solenoid 127 to raise stop 129 into the path of the battery B. The battery B is then pushed up against stop 129 and rearwardly against the stop 133 so as to position it directly below the platen 13. A starter button 147 is then actuated and this energizes cylinder 55, causing the plunger 57 to be extended and the toggle linkages 61 and 65 to be moved to a relatively straight line position, thus moving the rods 47 and platen 13 downwardly onto the battery.

As the platen approaches the upper end of the uncovered battery B, the hold down fingers 111 engage and are halted in their downward movement by the straps connecting the battery plates to the posts 19 and 21. Continued downward movement of the platen while fingers 111 are halted causes the springs 121 to be compressed thus providing a lost motion connection between fingers 111 and molds 17 as the molds 17 move down to their operative position where the molds lower ends of the passages 75 encircle and surround the battery posts 19 and 21 in a manner illustrated in FIGURE 6.

The valve 95 is actuated, under the control of a conventional timer, for example (not shown), energized by the downward movement of platen 13, so that a large flame is directed down into the upper portion of the passage 75 of each mold. The nozzles connected to the gas delivery lines 93 cause the flame to be directed onto the upper ends of the posts 19 and 21, thereby melting the latter. The molten lead of the battery post members 19 and 21 is retained within the molds 17, thereby fusing the posts 19 and 21 together. Water is continually circulated through the passage 81 so that the molds are maintained at a relatively cool temperature and tend to solidify the molten lead. It has been found that the flames need be directed onto the upper ends of the post members 19 and 21 for only approximately three seconds in order to accomplish the melting of the upper ends of the posts. After the three seconds have elapsed, the high flow of gas is turned off by the valve 95 and the water circulating through the passages 81 in the molds causes the molten lead to solidify across the upper edge of the cell divider 79 between two adjacent posts 19 and 21. After a predetermined period of time, such as six seconds, the cylinder 55 is energized, causing the plunger 57 to be withdrawn into the cylinder and the linkages 61 and 65 to pull the rods 47 and platen 13 upwardly toward a retracted position. As the platen initially moves away from the upper end of the battery, the molds 17 move with it and are separated from the upper ends of the interconnected posts 19 and 21. While there is a tendency for the interconnected battery posts 19 and 21 to adhere to the molds 17 and thus be raised with the molds, such adherence and raising of the posts 19 and 21 is prevented by the lost motion connection between hold down fingers 111 and molds 17, which causes fingers 111, during the initial upward movement of the molds, to remain firmly in engagement with the upper ends of the straps S connecting the posts to the battery plates.

After the molds 17 and platen 13 have been raised slightly from the upper end of the battery, i.e., after the molds 17 have become separated from the upper end of the solidified and interconnected posts 19 and 21, the pin 117 will engage the lower end of the slot 119 in each sleeve 115, thereby causing the associated finger 111 to be raised upwardly from the strap-engaging position. It has bene found desirable to have a spring pressure of approximately fifty pounds in order to facilitate separation of the mold 17 from the solidified and interconnected posts 19 and 21. As the platen 13 is raised to its retracted position, switch 131 is actuated by engagement with clamp 69 and causes the solenoid 127 to lower the stop 129 out of the path of the battery B. The battery may then be moved to the right as viewed in FIGURE 1 off the base 27 onto a platform or conveyor for subsequent manufacturing operations. Another battery may then be moved onto the base in a manner previously described so that post member joining operations may be initiated again.

An alternate embodiment of the hold down means is indicated at 151 in FIGURES 9 and 10. Hold down means 151 includes a bar 153 secured, as by welding, to platen 13 and having a plurality of holes 155 formed therein for slidably receiving a rod 157 connected to a hold down finger 111. Each rod 157 is provided with a slot 159 through which a pin 161 connected to bar 153 extends for preventing any turning motion of the rod and associated hold down finger. The rods 157 extend up into cylinders 163 in a manifold 165 and have pistons 167 on their inner ends slidable in cylinders 163. Suitable rings 169 extend around the pistons 167 to provide a close fit between the pistons and the cylinder walls. The cylinders 163 are all interconnected by a passage 171 which is adapted to be connected to a supply of high pressure air.

A typical timing cycle of the apparatus of the invention using the air operated hold down members is illustrated is FIGURE 11. First the battery is moved across button 125 which raises stop 129. After the battery is seated against stop 129, the starter button 147 is actuated. This lowers the plate 35 in a manner described above and the molds 17 are properly fitted over posts 19 and 21. At the same time, the flow of water through cooling tubes 87 and 89 is initiated.

The flames issuing from the nozzles on the end of fuel lines 99 are then increased to melt the posts 19 and 21. At the same time, the flames are increased, the air pressure behind pistons 167 is increased to move the hold down fingers into engagement with straps S. The flames are next returned to a low intensity after a few seconds, i.e., after the upper ends of posts 19 and 21 have melted and fused. Following this, the flow of water through the cooling ducts is shut off, the plate 13 is raised and the siwtch 131 is actuated to release stop 129. The air pressure behind pistons 169 is next terminated and the cycle may be repeated with the next battery. The air pressure applying means are variable so that the pressure applied to straps S by the hold down fingers 111 may be varied depending upon the type of battery being fabricated.

If it is desired to join the post members of a battery of a different size, or in which the post members 19 and 21 are located in a different position, the platen 13 may be easily removed by loosening bolts 49 and slipping the platen off the rods or arms 47. Another platen with suitably arranged molds, burning tips 23 (FIGURE 3), and hold down fingers may then be slipped onto the lower ends of the rods 47 and secured by bolts 49. By making the burning tips 23 integral with each platen 13, individual adjustment of the burning tips 23 for different batteries in unnecessary, thereby providing for a quick change of platens for burning posts of other battery types.

In view of the above, it will be seen that the present invention provides a novel method and apparatus for joining battery post members in which the separation of molds and the post members is facilitated when the molds are raised from the post members, thereby preventing damage to the battery and preventing production delays.

As various changes could be made in the above constructions and methods without departing from the scope of the invention, it is intended that all matter contained in the above description or shown in the accompanying drawings shall be interpreted as illustrative and not in a limiting sense.

We claim:
1. Apparatus for joining confronting ends of battery cell plate connector post members together into an integral post crossing an intervening cell divider wall, comprising:
   a unitary mold proportioned to encircle the confronting ends of the connectors,
   means for moving said mold between a retracted position spaced from said confronting ends and an operative position in encircling relation thereto,
   heat producing means associated with said mold and adapted for heating and fusing said confronting ends together when said mold is in said operative position to retain molten metal, and
   separating means having a lost motion operative connection to said mold, said separating means being formed for holding said cell connectors against movement with said mold as the latter moves from said operative position toward said retracted position so as to separate the fused confronting ends of the post members from said mold.

2. Apparatus as described in claim 1, and wherein a platen is mounted for relative movement toward and away from the cell plate connector post members, and a plurality of said mold members are carried by said platen for joint movement therewith between said retracted position and said operative position.

3. Apparatus as described in claim 2, and wherein said separating means comprises a plurality of fingers movably connected to said platen, and means biasing said fingers 4. Apparatus as described in claim 1, and wherein said mold is provided with cooling means adapted for preventing excessive heat rise in said mold during said heating and fusing of the confronting ends of the battery cell plate connector post members.

5. Apparatus as described in claim 4, and wherein said cooling means includes coolant passages formed in said mold for circulation of coolant therethrough.

6. Apparatus as described in claim 2, and wherein adjustment means is connected to said platen and is formed for selectively adjusting the location of said molds in said retracted and operative positions.

7. Apparatus as described in claim 2, and wherein said separating means comprises a plurality of elongated fingers, a rod connected to each finger and mounted on said platen for axial movement, and a spring for each finger biasing the latter away from said platen and toward the confronting ends of battery cell plate connector post members.

8. Apparatus as described in claim 2, and wherein said separating means comprises a plurality of elongated fingers, a rod connected to each finger and mounted on said platen for axial movement, and means for applying air pressure to said rods to bias the latter axially to urge said fingers away from said platen and toward the confronting ends of battery cell plate connector post members.

9. Apparatus as described in claim 2, and wherein said apparatus is provided with a base adapted for supporting a battery case having dividers defining a plurality of cells and plate assemblies in such cells providing confronting pairs of connector post members straddling the cell dividers, said molds being positioned in spaced relation on said platen whereby each of the pairs of connector post members will be encircled by one of said molds when the molds are in said operative position.

10. Apparatus as described in claim 9, and wherein said separating means comprises a plurality of fingers, a plurality of rods connected to said fingers and mounted for axial movement relative to said platen, and spring means biasing said fingers away from said platen and toward said plate assemblies, said fingers being adapted to engage and press said plate assemblies toward said base from movement of said platen toward said operative position, said fingers being adapted to urge said plate assemblies toward said base during initial movement of said platen and molds away from said operative position whereby said plate assemblies will be held down while said molds separate from the fused post members, said fingers thereafter being moved away from the plate assemblies as said platen and molds proceed to said retracted position.

11. Apparatus as described in claim 10, and wherein said spring means comprises a plurality of compression springs interposed between said fingers and said platen and encircling rods.

12. Apparatus as described in claim 10, and wherein said spring means comprises air pressure means biasing said fingers away from said platen and toward the plate assemblies.

13. Apparatus as described in claim 9, and wherein said apparatus also includes a frame for supporting said platen, and means provided on the frame for selectively adjusting the location of said operative position of said platen and molds.

14. Apparatus as described in claim 9, and wherein conveyor means is provided for moving a battery case across said base, retractable stop means is associated with said base and is formed for selectively halting a battery case moving across said base in a desired position, first signal means for actuating said retractable stop means to intercept and halt a battery case in response to the approach of a battery case to said desired position, and second signal means for actuating said retractable stop means to release said battery case in response to movement of said platen and molds out of said operative position.

15. Apparatus as described in claim 9, and wherein a post extends upwardly from said base, a carrier is mounted for vertical movement on said post, and said platen is detachably connected to said carrier for vertical movement therewith, said means for moving said mold between said retracted and operative positions being detachably connected to said platen.

16. Apparatus as described in claim 2, and wherein each of said molds is formed with a coolant passage adapted for connection to a source of circulating coolant and formed for circulation of the coolant through said mold to keep the latter at relatively low temperature during heating and fusing of the post members by said heat producing means.

17. Apparatus as described in claim 1, and wherein said mold comprises a body having a first passage therethrough for receiving and encircling the post members and a second passage adapted for connection to a source of circulating coolant and formed for allowing the coolant to flow through the body to cool the latter and the fused post members in said first passage.

18. Apparatus as described in claim 2, and wherein said heat producing means is mounted on said platen in fixed relation to said molds and is adapted for heating each pair of post members encircled by said molds when said platen and molds are in said operative position.

19. Apparatus as described in claim 18, and wherein said heat producing means comprises lead burning tips mounted above said molds in position to direct their flames downwardly into said molds against the ends of the post members encircled by the molds.

References Cited

UNITED STATES PATENTS

| | | | |
|---|---|---|---|
| 2,004,340 | 6/1935 | Patterson | 164—112 |
| 3,259,525 | 7/1966 | Wilson | 164—108 X |
| 3,138,860 | 6/1964 | Meshew | 228—58 X |
| 2,625,897 | 1/1953 | Mann et al. | 164—333 |
| 1,197,920 | 9/1916 | Donoghue | 228—44 |
| 2,762,094 | 9/1956 | Vieth | 164—404 X |
| 2,764,115 | 9/1956 | Korfhage et al. | 228—58 X |
| 2,265,413 | 12/1941 | Young | 164—333 X |
| 2,539,318 | 1/1951 | Orsino | 29—204 |

J. SPENCER OVERHOLSER, Primary Examiner

V. K. RISING, Assistant Examiner

U.S. Cl. X.R.

136—176; 164—404; 228—58